(12) United States Patent
Crumpler, Jr.

(10) Patent No.: US 8,672,048 B2
(45) Date of Patent: Mar. 18, 2014

(54) TRACTOR PULL BAR MOUNTING BRACKET ASSEMBLY

(76) Inventor: Eugene Crumpler, Jr., Abernathy, TX (US)

( * ) Notice: Subject to any disclaimer, the term of this patent is extended or adjusted under 35 U.S.C. 154(b) by 10 days.

(21) Appl. No.: 13/561,401

(22) Filed: Jul. 30, 2012

(65) Prior Publication Data
US 2014/0027137 A1 Jan. 30, 2014

(51) Int. Cl.
*A01B 35/20* (2006.01)
(52) U.S. Cl.
USPC .......................................... 172/611
(58) Field of Classification Search
USPC .................... 172/611; 280/759, 760
See application file for complete search history.

(56) References Cited

U.S. PATENT DOCUMENTS

| | | | |
|---|---|---|---|
| 3,110,275 A | 11/1963 | Bonney | |
| 3,237,701 A | 3/1966 | Morkoski | |
| 3,480,294 A * | 11/1969 | Lichti | 172/611 |
| 3,492,019 A * | 1/1970 | Folkerts | 280/759 |
| 3,622,174 A * | 11/1971 | Wakeen et al. | 280/760 |
| 3,888,507 A | 6/1975 | Berghausen | |
| 3,893,516 A | 7/1975 | Zimmerman | |
| 3,991,891 A * | 11/1976 | Cox | 414/719 |
| 4,232,883 A * | 11/1980 | Bourgeous et al. | 280/759 |
| 4,299,405 A | 11/1981 | Withers et al. | |
| 4,518,047 A * | 5/1985 | Peterson et al. | 172/611 |
| 4,936,737 A * | 6/1990 | Rae et al. | 414/686 |
| 6,000,203 A | 12/1999 | Weatherbee et al. | |
| 6,035,941 A * | 3/2000 | Hirooka et al. | 172/274 |

* cited by examiner

*Primary Examiner* — Thomas B Will
*Assistant Examiner* — Joel F. Mitchell
(74) *Attorney, Agent, or Firm* — Jacobson Holman PLLC

(57) ABSTRACT

A pull bar mounting bracket assembly is provided for mounting to the weight rack on the front of a given make of tractor. The mounting assembly includes two brackets positioned on either end of a row of weights that are made for said tractor make and supported on the weight rack, the brackets also being made for the given make of tractor and supported on the weight rack like the weights. The brackets have apertures that align with corresponding apertures in the weights to allow a bolt to be extended through the weights and secured at each end to the brackets. Each bracket also supports a clamp having a fixed clamp base and a removable clamp lock that are used to removably secure a pull bar to the brackets. The pull bar mounting bracket assembly can be easily removed from one model of the given make of tractor to another model of that tractor make without requiring any modification or customization of the mounting assembly or the tractors.

11 Claims, 7 Drawing Sheets

TRACTOR PULL BAR MOUNTING BRACKET ASSEMBLY

BACKGROUND OF THE INVENTION

1. Field of the Invention

The present invention is related to the field of farm equipment and, more particularly, to a pull bar mounting bracket assembly for a tractor.

2. Description of the Related Art

To reduce the time needed to fully plow, fertilize, harvest and otherwise work a field using a tractor, equipment being pulled by the tractor to perform these tasks has been widened to increase the width of the swath covered with each pass of the tractor. One way to achieve this increased width is to use two or more pieces of equipment connected to one another in a side by side arrangement, thereby at least doubling the swath width. As the number of equipment units is increased, the pulling load on the tractor is, of course, increased. If the load becomes too great, the backward drag on the rear of the tractor may cause the front end of the tractor to rise up off the ground. To prevent this, the front of the tractor is provided with a weight rack onto which a desired number of weights may be secured to provide ballast to keep the front end of the tractor down and the tractor level.

While the weights stabilize the tractor when pulling a wide assembly of multiple pieces of equipment including, for example, a center piece of equipment and two or more side or wing pieces of equipment, the connections between the center piece and the wing pieces of equipment are stressed when the tractor moves forward. More particularly, since only the center piece of equipment is typically hitched to the tractor, the wing pieces are pulled along with the center piece through their respective connections to the center piece. This can result in the wing pieces bending back relative to the center piece as the equipment is pulled.

To address the bending back problem, a pull bar is mounted on the front of the tractor, typically to the weight rack. The pull bar extends parallel with the tractor's axles, and extends beyond the width of the tractor on either side thereof. Pull chains or cables are attached between the ends of the pull bar and the wing pieces of the equipment assembly. The pull chains thereby pull directly on the wing pieces to help rigidify and stabilize the equipment assembly being pulled by the tractor.

The pull bar mounting arrangement for each tractor make and model can differ from that of other tractor makes and models, so that each pull bar mounting structure is typically specific to a particular tractor make and model. Hence, according to known methods, pull bars are mounted to the weight rack in different ways in an ad hoc manner depending on the tractor. As new model years are released, the manner in which the pull bar must be mounted may be different than the previous model, requiring the tractor to be customized with appropriate drilling and bolting arrangements in order to mount the pull bar to the new model year tractor. The weight racks on the front end of the tractors, however, typically remain the same.

Therefore, a need exists for a pull bar mounting assembly that can be readily mounted on and transferred between different models of a given make of tractors, thereby effectively standardizing the pull bar mount for that make of tractor.

SUMMARY OF THE INVENTION

In view of the foregoing, the present invention is directed to a tractor pull bar mounting bracket assembly configured to be mounted on the weight rack at the front end of a tractor. The assembly includes a pair of brackets and a pair of clamps. When the desired number of weights is placed on the weight rack, the two brackets are placed on either side of the weights where the right and left brackets act as "bookends". The brackets, which are supported on the weight rack by their own weight in the same way as the weights, can be moved inwardly and outwardly with respect to the center of the weight rack to accommodate the number of weights mounted on the tractor at any given time. The brackets are secured to one another and to the weights inbetween by a long rod such as an all threaded rod or all threaded bolt that is bolted through the brackets and weight group.

Each bracket includes a two-piece clamp including a clamp base and a removable clamp lock. The clamp base is fixedly secured to the front of the bracket. When the brackets are positioned on either side of the weights and secured in place on opposite sides of the weights on the weight rack, a pull bar is positioned within the two clamp bases so that the pull bar extends across the front of the tractor parallel with the tractor's axles and in front of the weight rack. The pull bar is secured to the clamp bases by aligning the clamp locks with the clamp bases and bolting the two parts of each clamp together with the pull bar sandwiched therebetween, to complete engagement of the pull bar within the mounting bracket assembly. The brackets with their clamps thereby provide an effective and easy means of mounting a pull bar to the standard weight rack on a tractor in which the brackets can be mounted in different positions along the length of the weight rack to bring the brackets immediately adjacent or into abutment with the number of weights being used so that the ballast weights can be thought of as "books" between the bracket "bookends".

In the disclosed embodiment, the clamp base defines a generally C-shaped opening or channel sized to receive the pull bar. The removable clamp lock also defines a generally C-shaped opening or channel having a size similar to the generally C-shaped channel of the clamp base, but opening in the opposite direction when mounted to the pull bar. When the brackets are mounted on opposite sides of the ballast weights on the weight rack, and the clamp locks are bolted to the clamp bases, the pull bar is sandwiched in between the two opposed C-shaped channels to lock the pull bar to the brackets.

To remove the pull bar mounting bracket assembly, the clamp locks are unbolted from the clamp bases and removed, releasing the pull bar, and the all threaded rods are removed to release the brackets from the weights. The brackets can then be easily lifted away from the weight rack and thereafter secured to the weight rack of another tractor which can be one of many different models of the same make of tractor. The pull bar may then be secured between the clamp bases and the removable clamp locks in the same manner by which the pull bar was mounted to the first tractor, so that no modification or customization of the second tractor is required to accommodate the pull bar mounting bracket assembly of the present invention.

Accordingly, it is an object of the present invention to provide a pull bar mounting bracket assembly which is easily mounted to the weight rack of a tractor and secured to a group of weights also supported on the weight rack, and which can be removed and used on another tractor model of the same make without the need to modify the other tractor or the pull bar mounting bracket assembly.

Another object of the present invention is to provide a pull bar mounting bracket assembly in accordance with the preceding object in which the pull bar mounting bracket assembly includes a pair of brackets that are positioned on either side of the ballast weights on the weight rack and configured to be removably secured to each another and to each of the weights.

A further object of the present invention is to provide a pull bar mounting bracket assembly in accordance with the preceding objects in which each of a pair of brackets has a back side configured to fit over the weight rack of a tractor and be supported thereon by the brackets' own weight so that the brackets are essentially mounted to the weight rack in the same way that the weights are mounted, with both brackets being horizontally aligned with and secured to a plurality of ballast weights also mounted on the weight rack.

A still further object of the present invention is to provide a pull bar mounting bracket assembly in accordance with the preceding objects in which the brackets can be moved inwardly and outwardly with respect to the center of the weight rack to accommodate the number of weights mounted on the tractor and to be adjacent such weights while the weights are substantially centered along the length of the weight rack.

Yet a further object of the present invention is to provide a pull bar mounting bracket assembly in accordance with the preceding objects in which each bracket of the pull bar mounting bracket assembly includes a clamp base fixedly connected to the front of the bracket, each clamp base defining a generally C-shaped opening or channel sized to receive a pull bar and cooperative to engage with a removable clamp lock that also defines a generally C-shaped opening or channel, the clamp lock opening facing the clamp base opening and being bolted to the clamp base to sandwich the pull bar between the two C-shaped channels in the clamp pieces and lock the pull bar to the brackets.

A still further object of the present invention is to provide a pull bar mounting bracket assembly in accordance with the preceding objects in which the brackets have at least one cutout positioned to align with corresponding cutouts in each of the ballast weights and usable as a handle to carry the brackets.

Still another object of the present invention is to provide a pull bar mounting bracket assembly in accordance with the preceding objects in which each bracket has at least one generally cylindrical hole positioned to align with corresponding holes in each of the ballast weights and through which an all threaded rod or bolt is passed to extend from one bracket, through the weights to the other bracket, substantially parallel with the pull bar, each end of the all threaded rod being bolted to a corresponding one of the brackets at the respective end to lock the brackets and weights together.

Yet another object of the present invention is to provide a pull bar mounting bracket assembly in accordance with the preceding objects that is simple in structure and which can be manufactured at low cost but yet efficiently enables a pull bar to be interchangably mounted to the front of different models of a given make of tractor without the need to customize either the pull bar mounting bracket assembly or the tractors.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
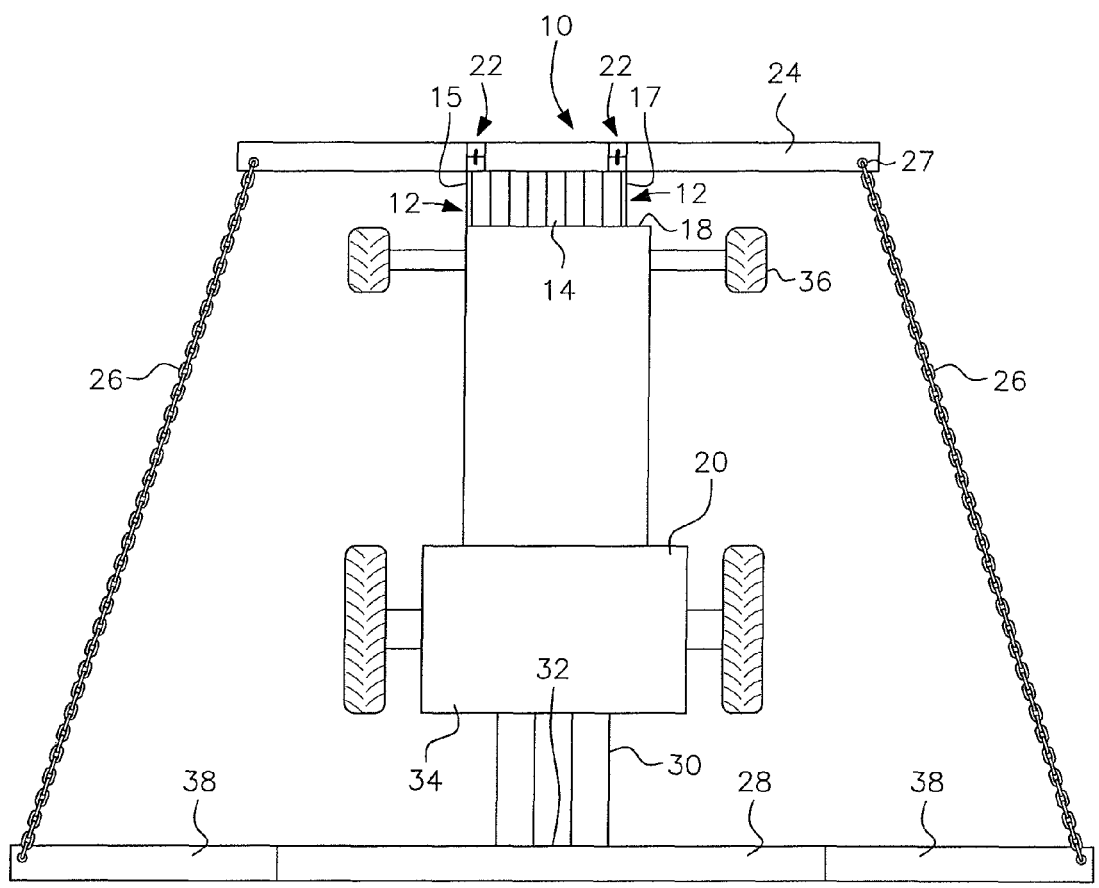
FIG. 1 is a top view illustrating a tractor having a pull bar mounting bracket assembly in accordance with the present invention, as mounted thereon with the pull bar and the ballast weights, and with the ends of the pull bar connected to equipment being pulled behind the tractor.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, the present invention is directed to a pull bar mounting bracket assembly, generally designated by reference numeral 10. The pull bar mounting bracket assembly includes two plates or brackets, generally designated by reference numeral 12, each of which is positioned on one end of a stack of weights 14 arranged side by side and mounted to a weight rack 16 (see FIG. 2) on the front end 18 of a tractor 20. Each bracket 12 supports a pull bar securing component, generally designated by reference numeral 22, which is used to secure a pull bar 24 to the brackets 12. Chains 26 or cables are secured by hooks 27 or the like on each end of the pull bar 24. These chains 26 extend back to equipment 28 which is being pulled behind the tractor 20 using a hitch arrangement 30 by which the center 32 of the equipment is hitched to the rear 34 of the tractor. The weights serve as ballast to keep the front wheels 36 of the tractor on the ground when pulling a heavy load, such a 16-row equipment, while the connection between the pull bar and the wings 38 of the equipment 28 stabilizes the equipment and prevents the outer pieces or wings 38 from bending back as the tractor moves forward.

Figure 2:
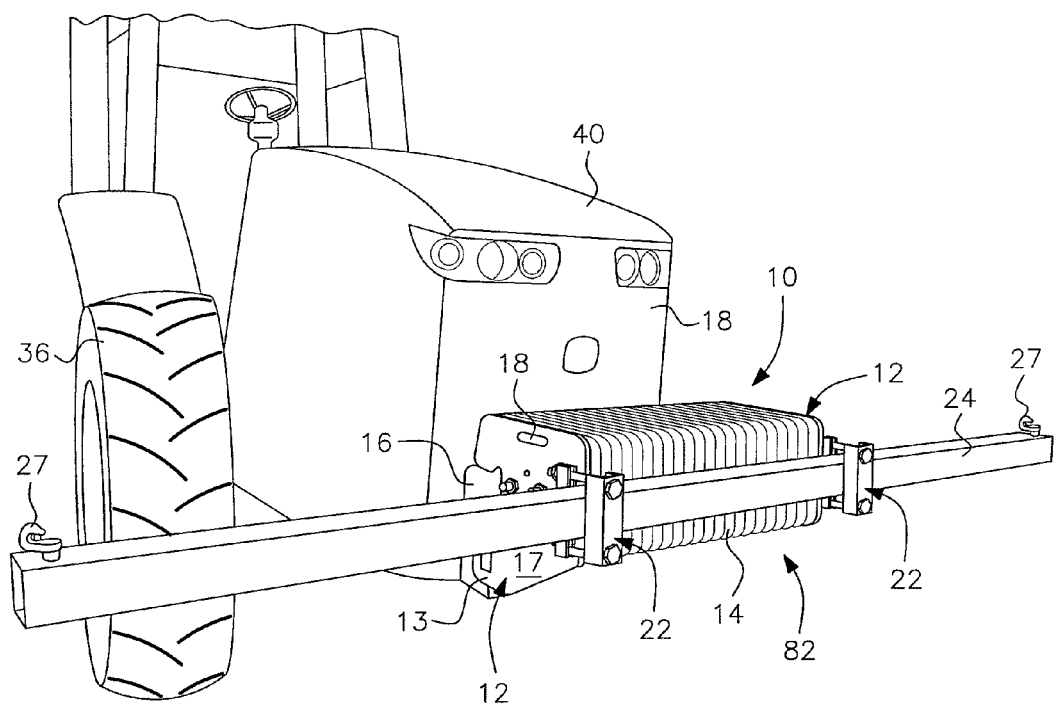
FIG. 2 is a front perspective view of a John Deere tractor with a pull bar mounting bracket assembly in accordance with the present invention mounted on the weight rack at the front of the tractor and having a pull bar mounted thereto.

A first embodiment of the pull bar mounting bracket assembly of the present invention, as constructed to fit on a John Deere tractor 40, is shown in FIG. 2. The tractor 40 has a weight rack 16 to support a plurality of weights 14 which are specifically constructed to fit onto the weight rack of a John Deere tractor. The brackets are also specifically constructed to mount onto the weight rack of a John Deere tractor in the same way in which the John Deere weights are mounted.

The brackets 12 of the pull bar mounting bracket assembly 10 are mounted on the weight rack on either end of the row of weights 14. The pull bar securing components are connected to each of the brackets. According to the illustrated embodiment, the pull bar securing components are clamps 122 mounted on an outer surface of the brackets as mounted on either end of the weights. When configured with clamps 122 as the pull bar securing components, the brackets 12 when fully constructed for use are not identical in the sense that the left bracket 15 has a clamp mounted for placement of the left bracket on the left end of a plurality of weights on the weight rack, while the right bracket 17 has a clamp mounted for placement of the right bracket on the right end of the plurality of weights, as will become more evident hereinafter. As used herein, left is the side corresponding with the left side of the tractor and right is the side corresponding with the right side of the tractor as perceived by the driver of the tractor when in the cab. Before the clamps are mounted, however, both brackets are the same in construction. While the illustrated embodiment shows the use of clamps, the pull bar securing components could be configured in other ways such as through an upwardly opening channel formed in the front of the brackets that supports the pull bar on at least the front, rear and bottom sides of the pull bar, or by a side opening channel into which the pull bar is inserted so that the channel is contacted by or is adjacent to the top, rear and bottom sides of the pull bar.

Figure 3:
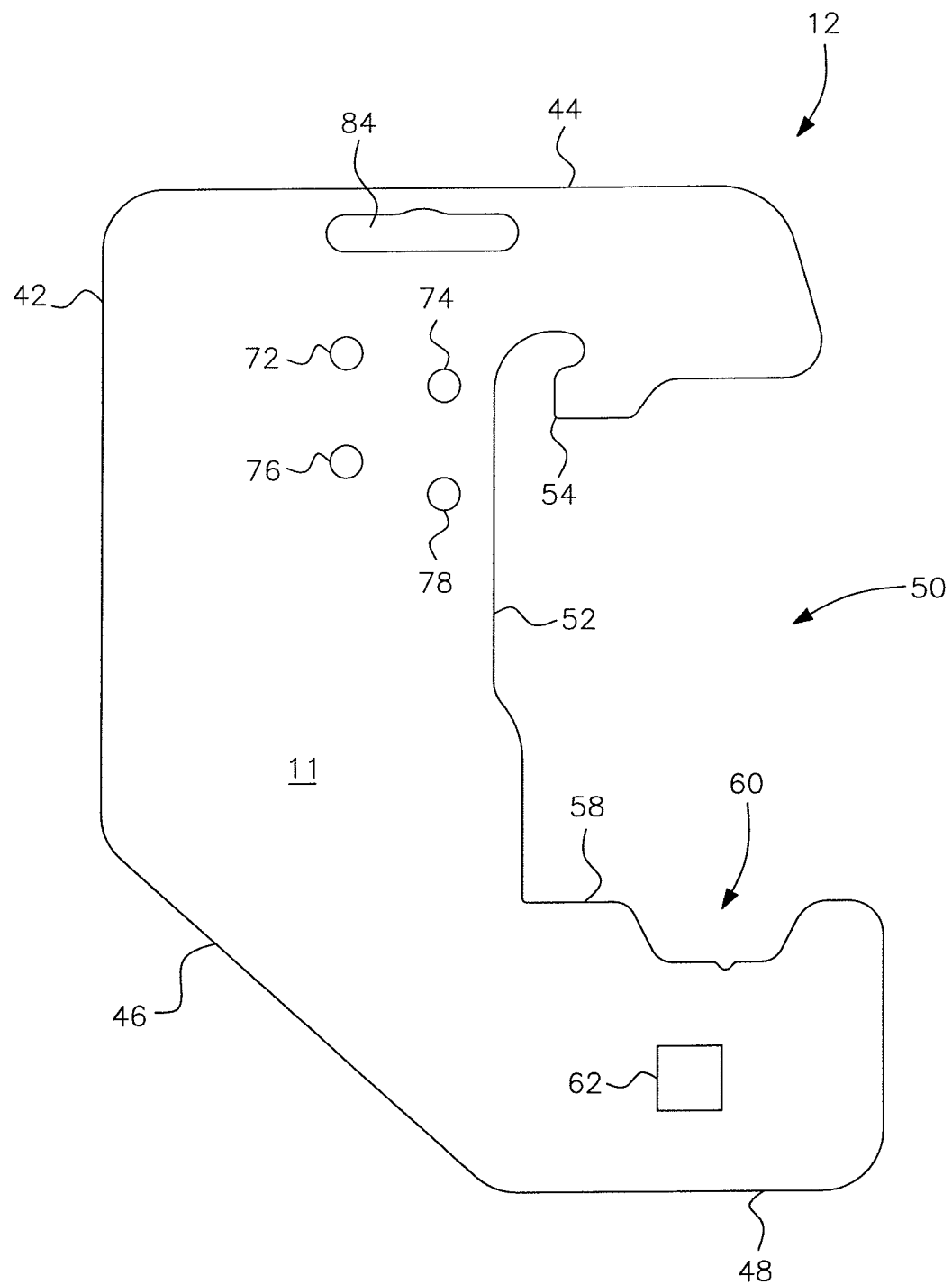
FIG. 3 is a side view of one bracket shown in FIG. 2 but without the clamp.

As shown in FIG. 3, each bracket 12 has a generally flat front face 42, a generally flat top edge 44, a generally vertical front face 42, a downwardly sloped ramp edge 46 extending downwardly from the front face, and a generally flat bottom edge 48 extending from the bottom of the ramp edge 46. Each bracket also has a substantially planar left side 11 and a substantially planar right side 13 (see FIG. 2). While the configuration of these edges and front face may be altered without departing from the scope of the present invention, the shaping of the brackets as described corresponds with the shaping of the standard ballast weights that are made to be used with John Deere tractors.

Figure 4:
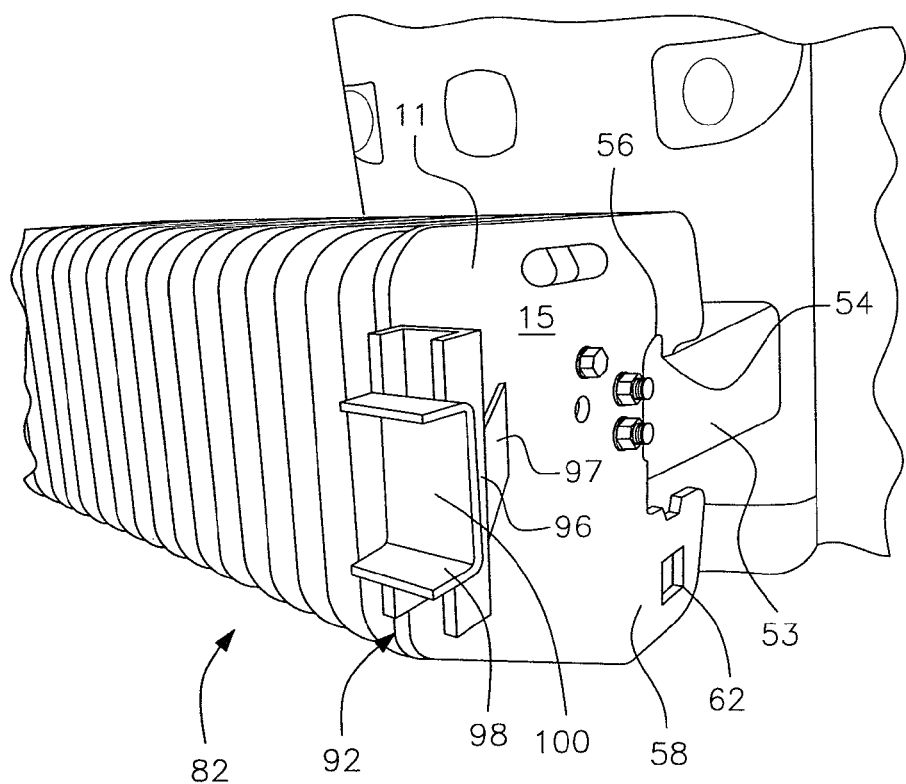
FIG. 4 is a front perspective view of the left bracket shown in FIG. 2 with the clamp base fixedly mounted thereto and without a pull bar.
Figure 5:
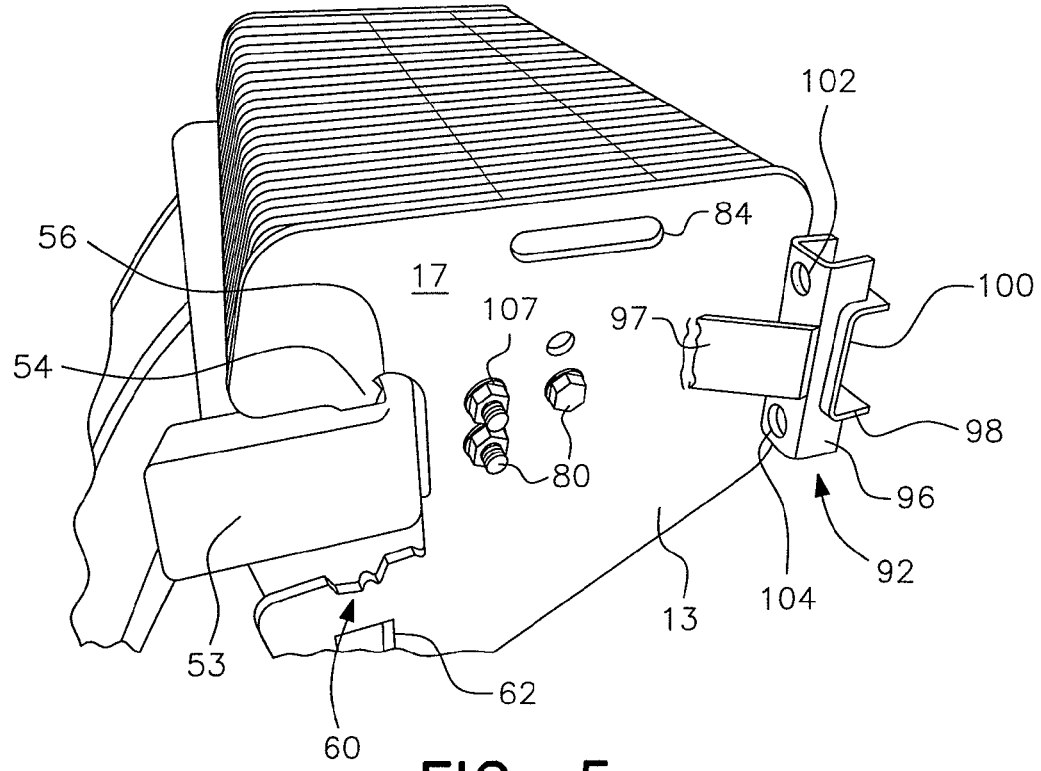
FIG. 5 is a rear perspective view of the right bracket shown in FIG. 2 with the clamp base fixedly mounted thereto and without a pull bar.

The rear side, generally designated by reference numeral 50, of each bracket 12 is shaped to accommodate the weight rack of a John Deere tractor and includes a large notch 52 into which the weight rack 53 of the tractor is inserted. Above the notch, the bracket includes an upper hook 54 that fits over and locks onto an upper edge 56 of the weight rack 53 as shown in FIGS. 4 and 5, allowing the bracket to be supported by its own weight on the weight rack. The bottom leg 58 of the rear side of the bracket below the notch has a channel, generally designated by reference numeral 60, shaped to accommodate the John Deere weight rack. Beneath the channel 60, the bottom leg 58 has a substantially square aperture 62 that is used to interlock the weights.

Each bracket also has a plurality of generally cylindrical holes, 72, 74, 76 and 78 placed to align with the existing holes in the weights through which bolts or rods are extended to lock the plates to the weights which will hold the weights together. Accordingly, at least one rod or bolt 80 extends through at least one of these holes in each bracket, such as hole 76 in the illustrated embodiment, and is secured to both brackets 12, having passed through corresponding holes in the weights (not shown) so as to extend across and parallel with the front of the tractor. The bolt 80 locks the weights together as well as the brackets to the weights. The bolt is preferably an all threaded bolt or an all threaded rod onto which nuts may be threaded.

In addition to the four circular holes 72, 74, 76 and 78, the brackets 12 also have an elongated cutout 84 adjacent the top edge 44 that aligns with similar cutouts in each of the weights and which can be used as a handle when transporting the brackets between tractors.

The front of each bracket 12 supports a clamp 22 which is used to secure the pull bar 24 to the brackets. On the left bracket 15, the clamp is mounted on the left side 11 of the bracket (see FIG. 4), and on the right bracket 17 the clamp is mounted on the right side 13 of the bracket (see FIG. 5) so that on each bracket, as mounted on the weight rack, the clamp 22 is on the outer side of the bracket.

Figure 6:
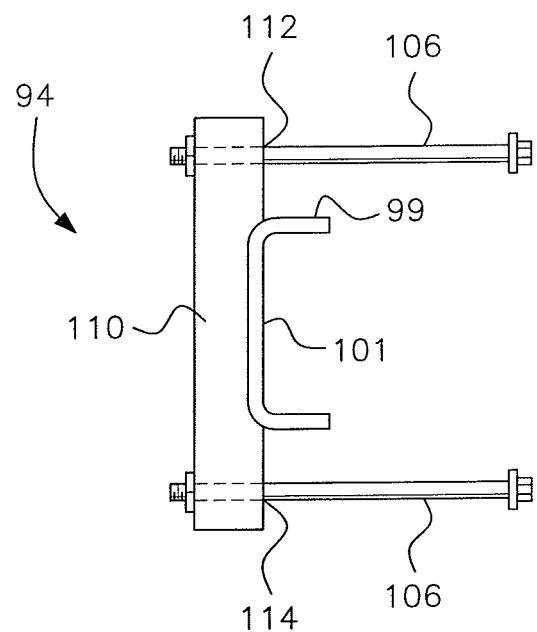
FIG. 6 is a side view of the clamp lock shown in FIG. 2, including bolts for fastening the clamp lock to the clamp base.
Figure 7:
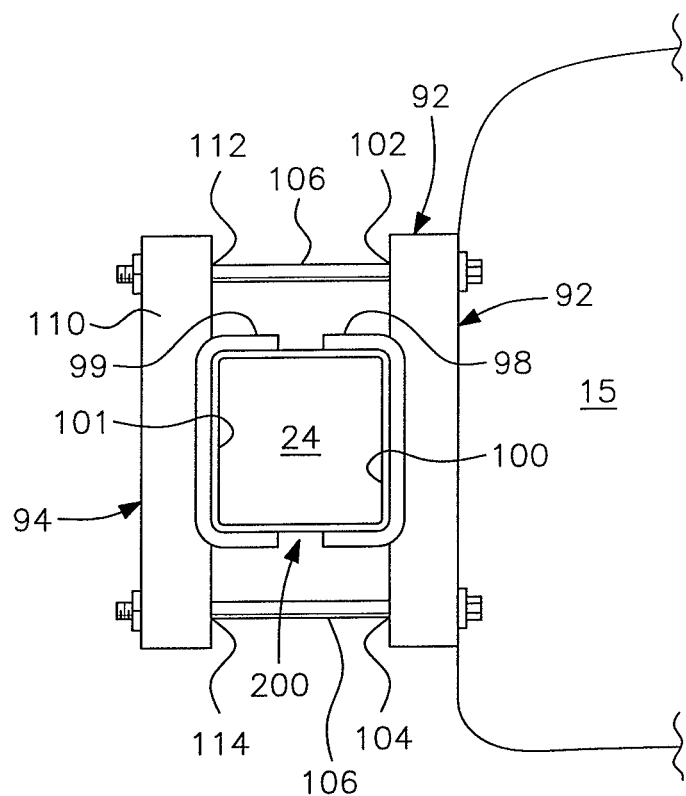
FIG. 7 is a side view of the clamp lock shown in FIG. 6 as secured to a clamp base on a bracket with a pull bar in between and held by the two clamps.

The clamp 22 includes a clamp base generally designated by reference numeral 92 as shown in FIGS. 4, 5 and 7, and a clamp lock generally designated by reference numeral 94 as shown alone in FIG. 6 and with the clamp base 92 and pull bar 24 in FIG. 7. According to the illustrated embodiment, the clamp base 92 is fixedly mounted on the bracket, such as by welding. The clamp base 92 could, however, be removably secured to the bracket, such as by bolts or other fastening members.

As shown in FIGS. 4 and 5, the clamp base 92 includes a generally vertical mounting member 96 that is secured to the bracket 12 and reinforced by an angled member 97, also secured to the bracket. Welded to, or otherwise permanently secured to the mounting member 96, is a pull bar support 98 defining a forwardly facing, generally C-shaped opening or channel 100 that is used to hold and support the pull bar 24. Apertures 102, 104 are formed in the mounting member adjacent the top and bottom thereof for receiving fastening members such as bolts 106 (see FIGS. 6 and 7) used to secure the clamp lock 94 to the clamp base 92.

The clamp lock 94, as shown in FIGS. 6 and 7, also includes a vertical member 110 having apertures 112, 114 for receiving the fastening elements or bolts 106. When the pull bar 24 is placed into the channel 100, each clamp lock 94 is positioned opposite a respective clamp base 92 to align the apertures 102 and 112, with the apertures 104 and 114, respectively. The bolts 106 are then inserted through the aligned pairs of apertures and tightened using nuts 107 to secure the clamp lock and the clamp base together, with the pull bar sandwiched therebetween. To remove the pull bar, it is only necessary to loosen the nuts 107 and unfasten the bolts 106, which releases the clamp lock 94 from the clamp base 92, allowing the pull bar to be removed. The bolts 106 are preferably 1⅛ inch bolts, although bolts of other sizes could be used.

Figure 8:
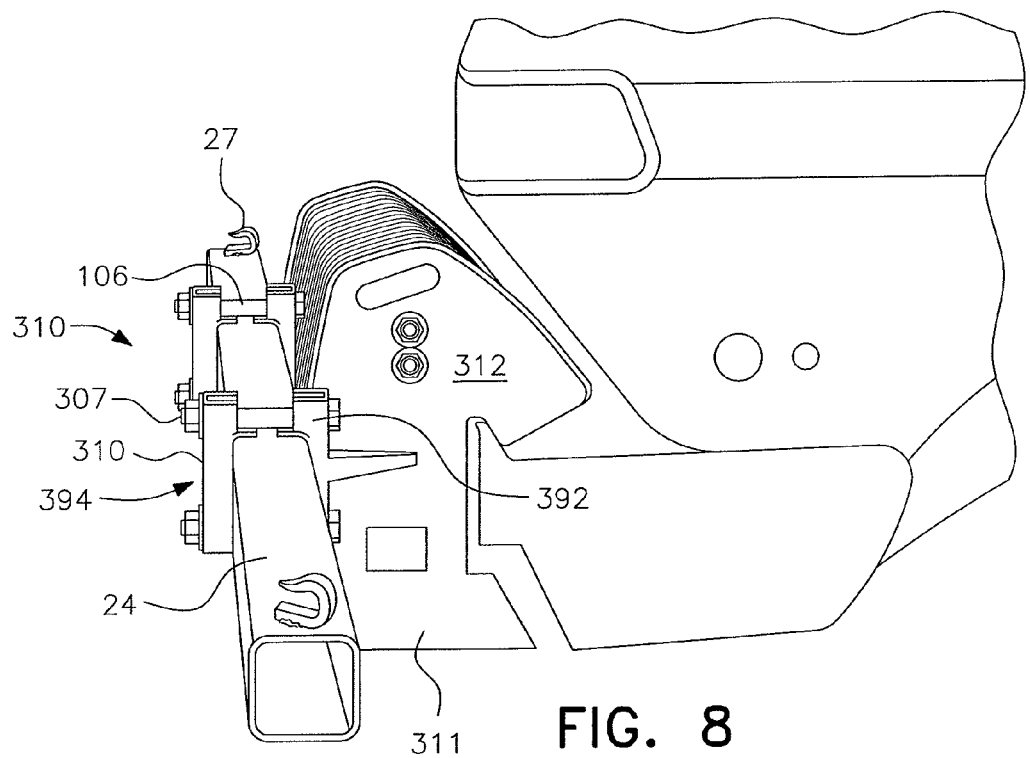
FIG. 8 is a side perspective view of a pull bar mounting bracket assembly for a different make of tractor with a pull bar mounted thereto and showing the left bracket.

As further shown in FIGS. 6 and 7, the clamp lock preferably also includes a pull bar support 99 defining a generally C-shaped opening or channel 101 that is used to hold and support the pull bar 24. The clamp lock is positioned with the C-shaped opening or channel 101 facing rearwardly when secured to the clamp base. The pull bar support 99 on the clamp lock is not necessary, however, provided the pull bar support 98 on the clamp base defines a sufficiently deep channel 100 to support the majority of the width of the pull bar. Whether just the clamp base 92 or the clamp base 92 and the clamp lock 94 define a pull bar support channel, the depth of the channel 100, or the depth of the combined channels 100, 101, must be shallow enough to provide for a sufficient space, generally designated by reference numeral 200, to remain between the vertical members 96, 110 of the clamp base 92 and the clamp lock 94 when the pull bar is placed therebetween as shown in FIGS. 7 and 8. Such spacing is necessary so that the fastening elements 106 can be fully tightened on the pull bar without the vertical members or their pull bar supports 98, 99 coming into contact or otherwise interfering with one another.

While the pull bar securing components illustrated herein are all clamps having C-shaped channels, the present invention is intended to include clamps having differently shaped openings or channels to accommodate pull bars of different shapes. Such differently shaped openings or channels associated with the clamps may include, but are not limited to, an opening in each of the clamp base and clamp lock that is generally cylindrical to fit a generally tubular or pipe style pull bar, or an opening in each of the clamp base and clamp lock that is diamond-shaped to fit a diamond bar. Configurations in which the opening or channel is formed in only one of the clamp base or the clamp lock are also contemplated as described above in connection with the C-shaped openings or channels. The shape of the opening in the clamp base used to hold the pull bar can also be different from the configuration of the clamp lock, which may or may not have an opening, provided the two parts of the clamp can be secured to one another to hold the pull bar as described herein.

The pull bar securing components may also include pull bar support base structures formed on the front of the bracket, either as a separate component or integrally with the bracket. When formed on the front of the bracket, it is recommended that a reinforcing plate be secured to the front edge of the bracket so as to provide a mounting surface that is substantially perpendicular to the sides of the bracket. A pull bar support base structure, such as a clamp base with a forwardly facing channel or opening, is then mounted on the reinforcing plate. Configurations in which the pull bar support base structure is formed integrally with the bracket include an upwardly opening channel or a side opening channel as described above.

While not the preferred embodiment, pull bar securing components such as the clamps described herein could alternatively be mounted on the inner side of the bracket provided the front to rear length of the bracket is increased sufficiently to provide room for the clamp base. With this extended length, the bracket would project forwardly beyond the forward side of the weights.

In sum, the present invention is intended to encompass all styles of pull bar securing components that can be configured to work cooperatively with the brackets to removably secure a pull bar in a manner like that described herein.

Figure 9:
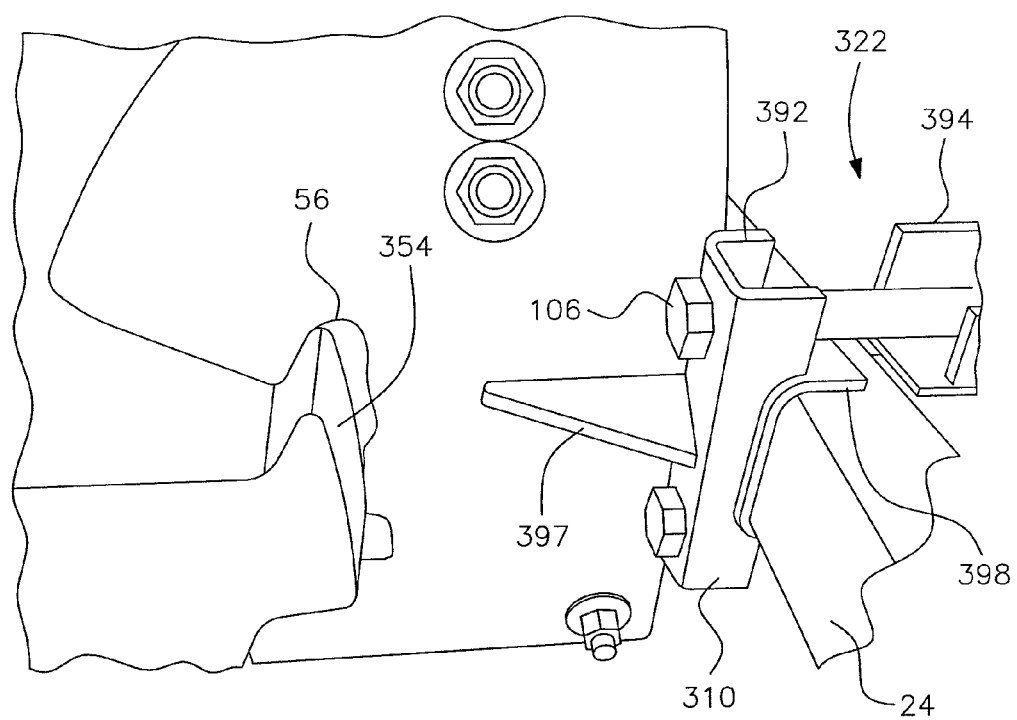
FIG. 9 is a close-up side perspective view of the pull bar mounting bracket assembly shown in FIG. 8, but showing the right bracket.

FIGS. 8 and 9 show a second embodiment of the pull bar mounting bracket assembly of the present invention configured for a Case International tractor. The precise shape of the brackets is different from the brackets designed for the John Deere tractor in order to accommodate the different configuration of the weight rack used on Case International tractors. The components of the pull bar mounting bracket assembly are, however, the same in function and use as those already described, and therefore will not be repeated herein. The components are, however, numbered with reference numerals that differ from those used in connection with the John Deere embodiment in that each reference numeral has a "3" added as a first digit. Therefore, the pull bar mounting bracket assembly in the second embodiment is identified with reference numeral 310, the brackets with reference numeral 312, the ballast weights with reference numeral 314, and so forth.

Figure 10:
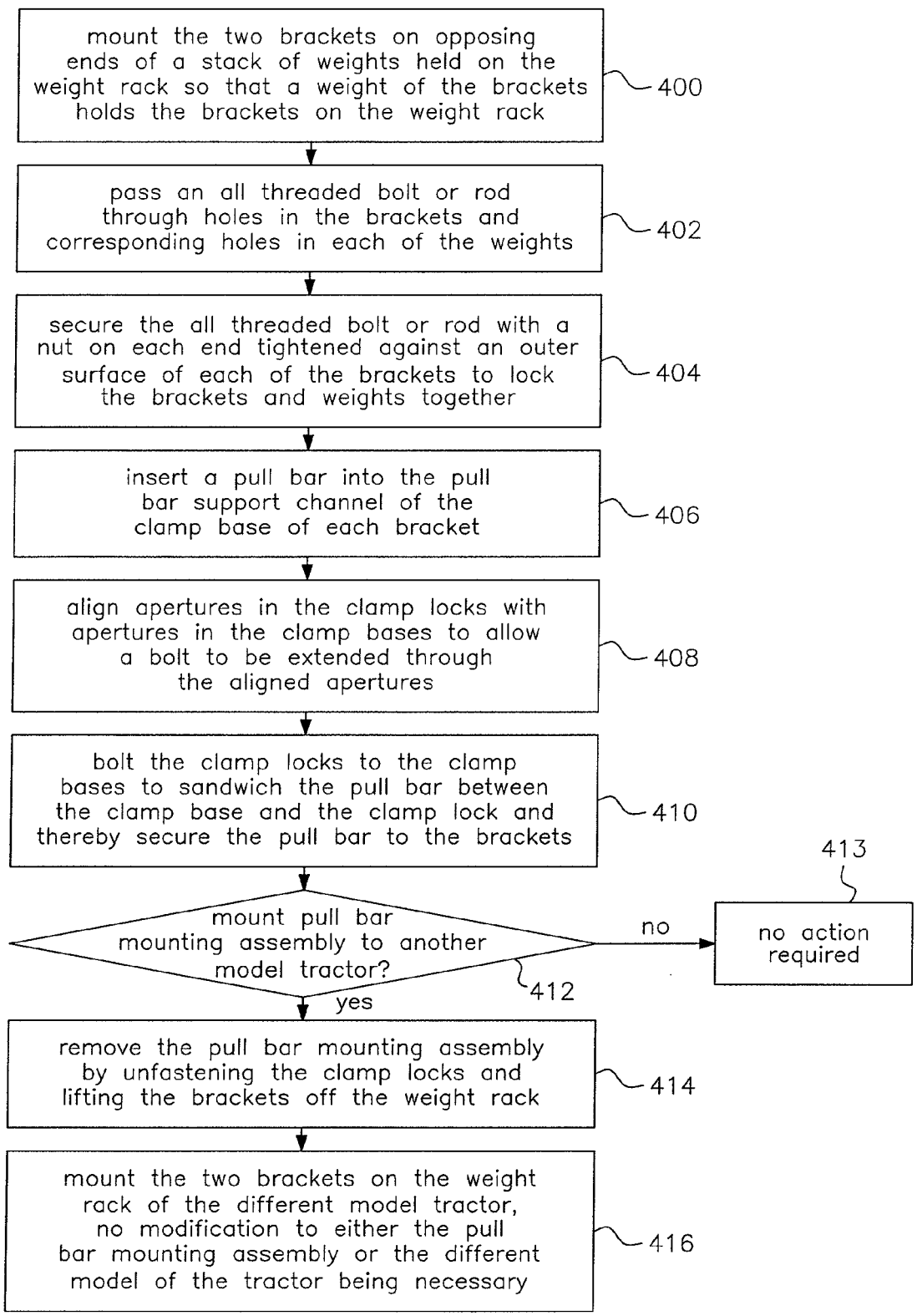
FIG. 10 is a flow chart of the method of mounting a pull bar to a tractor using the pull bar mounting bracket assembly in accordance with the present invention.

In both the first and second embodiments, as well as in other embodiments in which the pull bar mounting bracket assembly is adapted for other makes of tractor, including but not limited to Ford, Massey-Ferguson, Caterpillar, Kubota, etc., the pull bar mounting bracket assembly is mounted to the weight rack in the same manner as summarized in the flow chart of FIG. 10. First, the two brackets are placed on the opposite sides of the stack of weights and are mounted on the weight rack by hooking each bracket over the weight rack so that the weight of the brackets holds each bracket on the weight rack in the same manner that the weights are supported on the weight rack, step 400. The brackets can be mounted in various locations along the length of the weight rack as needed to bring them adjacent to and/or in abutment with each side of the stack of weights being used while keeping the weights essentially centered on the weight rack. Hence, the brackets may be moved outwardly to accommodate a greater number of weights and inwardly when fewer weights are being used. An all threaded bolt or rod is then passed through holes in the brackets and corresponding holes in each of the weights, step 402, which holes are in alignment due to the designing of the brackets to correspond with the weight design of a particular make of tractor. The all threaded bolt or rod is secured at each end with a nut against the outer surface of the brackets to lock the brackets and ballast weights together, step 404.

A pull bar is then inserted into the pull bar support 98, 398 of the clamp base 92, 392 of each bracket 12, 312, step 406. The clamp locks 94, 394 are aligned with the clamp bases so that fastening elements can pass through corresponding apertures in each of the clamp base and clamp lock associated with each bracket, step 408. Fastening elements such as bolts are then passed through the apertures and secured with nuts to clamp the pull bar between the clamp bases and the clamp locks and thereby secure the pull bar to the brackets, step 410.

If the user wants to mount the pull bar mounting assembly to another model of the same make of tractor, step 412, this can be easily accomplished. The user loosens the bolts and removes the clamp locks, releasing the pull bar. The all threaded bar or bars is/are then removed to release the brackets from the weights. The brackets can then be easily lifted off the weight rack in the same way as the weights, step 414. The brackets are then mounted on the weight rack of the second tractor, with no modification of either the pull bar mounting assembly or the second tractor being necessary, step 416. The user has only to repeat steps 402 through 410 to secure the pull bar to the other tractor. Of course, if the user does not want to mount the pull bar mounting assembly to another tractor, step 412, no further action is necessary, step 413, and the user can continue to operate the tractor as long as needed with the weight rack mounting bracket assembly and pull bar mounted thereto.

As explained herein, the particular shape and structural features of the brackets used in the pull bar mounting bracket assembly in accordance with the present invention may be adapted to fit any one of a large number of tractor makes and the present invention is intended to include all such bracket variations that, while somewhat different in appearance, are used in the manner described herein. While each tractor make requires a bracket constructed to fit onto its particular weight rack, the brackets made for a given make of tractor can be transferred readily between different models of that tractor make without any need to modify the different models of the given make of tractor or the bracket assembly made for that make of tractor.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, the components described herein may be modified to include embodiments for any make of tractor. Therefore, it is not desired to limit the invention to the specific examples disclosed or the exact construction and operation shown and described. Rather, all suitable modifications and equivalents may be resorted to, falling within the scope of the invention.

What is claimed is:

1. A tractor and pull bar mounting assembly in combination comprising:
    a tractor having a weight rack mounted on a front end of said tractor;
    a plurality of ballast weights mounted on said weight rack and shaped to be supported on said weight rack by their own weight;
    a pull bar mounting assembly including,
        a pair of brackets including a left bracket having a rear side configured for placement on a left end of the weight rack, and a right bracket having a rear side configured for placement on a right end of said weight rack, said brackets being configured to be supported on said weight rack by their own weight;
        a front portion of the left bracket supporting a first pull bar securing component and a front portion of the right bracket supporting a second pull bar securing component; and
    a pull bar removably secured to the front end of the tractor by the left and right brackets and the first and second pull bar securing components;
    each of said first and second pull bar securing components including a two-part clamp, each two-part clamp including a clamp base secured to a respective one of said left and right brackets and a clamp lock removably connectable to said clamp base, said clamp locks being connected by fastening elements to said clamp bases, respectively, with said pull bar sandwiched therebetween to removably secure the pull bar to the brackets;
    at least said clamp bases each having a pull bar support that defines a pull bar support opening into which the pull bar is inserted, said pull bar resting on said pull bar supports of said clamp bases, each of said clamp bases also including a generally vertical mounting member that is secured to a respective one of the left and right brackets, said pull bar supports secured to said mounting members, and said pull bar support openings defining a forwardly facing generally C-shaped channel that is used to hold and support at least the rear side of the pull bar.

2. The combination as set forth in claim 1, wherein each of said mounting members has apertures adjacent a top and bottom thereof for receiving the fastening elements used to secure the clamp locks to the clamp bases, respectively, said clamp locks having corresponding apertures that are aligned with the mounting member apertures to receive the fastening elements.

3. The combination as set forth in claim 1, wherein said fastening elements used to connect said clamp locks to said clamp bases are bolts enabling the clamp locks to be readily secured to and removed from the clamp bases, respectively.

4. The combination as set forth in claim 1, wherein each of said clamp locks also includes a generally vertical mounting member and a pull bar support secured to said mounting member, each of said clamp lock pull bar supports defining a rearwardly facing generally C-shaped channel that is used to hold and support the front side of the pull bar when the clamp locks are respectively secured to the clamp bases.

5. The combination as set forth in claim 4, wherein said fastening elements are bolts and a combined depth of each clamp base pull bar support and a respective clamp lock pull bar support on each side of the pull bar mounting assembly is less than a width of the pull bar so that the clamp bases and clamp locks respectively paired on each of said left and right brackets do not touch one another when the bolts are fully tightened with the pull bar sandwiched therebetween.

6. A pull bar mounting assembly for use on a tractor of a given make having a weight rack on a front end of the tractor for supporting a plurality of weights for said tractor make which provide ballast when the tractor is pulling equipment, said assembly comprising:
    a pair of brackets configured to be mounted in a same way as said plurality of weights on the weight rack of the tractor of a given make and to be supported thereon by a weight of said brackets, weights mounted on the weight rack being sandwiched between said pair of brackets, each bracket supporting a pull bar securing component configured to removably secure a pull bar to the brackets, each bracket having a hole therein that is aligned with corresponding holes in each of the weights, said brackets and said weights being secured together by an elongated fastening member passed through said holes and secured at each end to the brackets;
    each of said pull bar securing components including a two-part clamp including a clamp base secured to a respective one of said brackets and a clamp lock removably connectable to said clamp base, a space between said clamp base and said clamp lock when said clamp lock is connected to the clamp base accommodating a pull bar that is sandwiched between the clamp base and the clamp lock when the pull bar is mounted to the brackets using the pull bar mounting assembly;
    each of said clamp bases of said two-part clamps including a generally vertical mounting member that is secured to a respective one of said brackets and a pull bar support secured to said mounting member, said pull bar support defining a forwardly facing generally C-shaped channel that is used to hold and support the pull bar; and
    said brackets being removable from the tractor's weight rack and mountable on a second model tractor different from the first tractor but of the same given make with no modification to the brackets or either tractor being necessary in order to mount the pull bar on the second tractor.

7. The pull bar mounting assembly as set forth in claim 6, wherein said elongated fastening member is an all threaded bolt.

8. The pull bar mounting assembly as set forth in claim 6, wherein said clamp bases are welded to said brackets.

9. The pull bar mounting assembly as set forth in claim 6, wherein each of said mounting members has apertures adjacent a top and bottom thereof for receiving fastening elements used to secure the clamp locks to the clamp bases, respectively, said clamp locks having corresponding apertures that are aligned with the mounting member apertures to receive the fastening elements.

10. The pull bar mounting assembly as set forth in claim 9, wherein said fastening elements are bolts enabling the clamp locks to be readily secured to and removed from the clamp bases to mount and release the pull bar, respectively.

11. The pull bar mounting assembly as set forth in claim 6, wherein each of said clamp locks also includes a generally vertical mounting member and a pull bar support secured to said mounting member, each of said pull bar supports defining a rearwardly facing generally C-shaped channel that is used to hold and support the pull bar when the clamp locks are removably secured to the clamp bases, respectively.

\* \* \* \* \*